United States Patent
Marque-Pucheu et al.

(10) Patent No.: US 9,253,790 B2
(45) Date of Patent: Feb. 2, 2016

(54) RADIO RESOURCE ALLOCATION METHOD IN A RADIO COMMUNICATION SYSTEM

(75) Inventors: Gérard Marque-Pucheu, Verneuil (FR); Christophe Gruet, Elancourt (FR); Serge Delmas, Plaisir (FR); Christine Helias-Foret, Montigny-le-Bretonneux (FR)

(73) Assignee: CASSIDIAN SAS, Elan Court (FR)

( * ) Notice: Subject to any disclaimer, the term of this patent is extended or adjusted under 35 U.S.C. 154(b) by 344 days.

(21) Appl. No.: 13/582,080

(22) PCT Filed: Mar. 4, 2011

(86) PCT No.: PCT/EP2011/053316
§ 371 (c)(1),
(2), (4) Date: Aug. 31, 2012

(87) PCT Pub. No.: WO2011/107596
PCT Pub. Date: Sep. 9, 2011

(65) Prior Publication Data
US 2013/0003581 A1 Jan. 3, 2013

(30) Foreign Application Priority Data
Mar. 4, 2010 (FR) ...................................... 10 51559

(51) Int. Cl.
H04W 72/04 (2009.01)
H04W 72/08 (2009.01)

(52) U.S. Cl.
CPC ............ *H04W 72/087* (2013.01); *H04W 72/04* (2013.01)

(58) Field of Classification Search
None
See application file for complete search history.

(56) References Cited

U.S. PATENT DOCUMENTS

| 6,556,322 B1* | 4/2003 | Desurvire ...................... 398/98 |
| 7,979,076 B2* | 7/2011 | Hui et al. ...................... 455/450 |
| 2005/0041623 A1* | 2/2005 | Livet et al. ..................... 370/332 |
| 2006/0101168 A1* | 5/2006 | Roh et al. ........................ 710/33 |
| 2007/0086474 A1* | 4/2007 | Lee et al. ...................... 370/447 |
| 2009/0219810 A1* | 9/2009 | Polette et al. ................. 370/229 |

FOREIGN PATENT DOCUMENTS

EP 1175032 A1 1/2002

OTHER PUBLICATIONS

International Search Report mailed Jul. 4, 2011, in corresponding PCT Application No. PCT/EP2011/053316.

* cited by examiner

*Primary Examiner* — Hassan Phillips
*Assistant Examiner* — Ayanah George
(74) *Attorney, Agent, or Firm* — Novak Druce Connolly Bove + Quigg LLP.

(57) ABSTRACT

Radio blocs ($BR_{jp}$) shared in a predetermined frequency band during a periodic radio frame ($TR_i$) between base stations (BS) are allocated to applications in base stations and mobile stations. Each radio block spreading on frequencies ($C_j$) of said band during a time slot ($M\delta t$) of the radio frame and can be associated with an uplink or a downlink. To meet quality-of-service parameters required by an application, a base station estimates occupation rates of the radio blocks during consecutive radio frames, and allocates to the application at least one radio block having an occupation rate less than a threshold and a periodicity expressed in period of frame and depending on the required quality-of-service parameters. The base station are autonomous for the radio block allocations.

14 Claims, 6 Drawing Sheets

RADIO RESOURCE ALLOCATION METHOD IN A RADIO COMMUNICATION SYSTEM

CROSS-REFERENCE TO RELATED APPLICATIONS

This application is a §371 national phase entry of International Application No. PCT/EP2011/053316, filed Mar. 4, 2011, which claims priority to French Application No. 1051559, filed Mar. 4, 2010, wherein the contents of both are herein incorporated by reference in their entirety.

FIELD OF THE INVENTION

The present invention relates to a radio communication system including base stations and mobile stations that communicate with the base stations through radio resources shared in a predetermined wide frequency band and during radio frames.

The invention finds applications more specifically in Professional Mobile Radio (PMR) systems having their implementation depending on communication needs and radio coverage varying in time.

BACKGROUND OF THE INVENTION

In a radio communication system having a predetermined frequency band according to the mobile WiMAX (Worldwide interoperability for Microwave Access) label and the standard IEEE 802.16e to j, or according to the LTE (Long Term Evolution) technology, sharing the frequency band between base stations is fixed. Initially, each base station has only available a frequency channel consisting in a sub-band of the predetermined frequency band and accordingly, only limited radio resources allocated to it. According to requests of applications in the base station or a mobile station, the base station locally allocates uplink and/or downlink radio resources to each application. Thus, even if the predetermined frequency band is wide, only a few base stations can establish links with mobile stations.

For overcoming such a limitation of the radio resource allocation, it is known to implement a dialog between two base stations, either through a wire connexion, or through a radio path by means of a mobile station recorded in the two base stations. During such a dialog, one of the two base stations takes some radio resources initially allocated to the other base station, for a limited period of time.

However, the number of radio resources can not dynamically progress as a function of the application needs of the base stations, two base stations being unable to dialog remaining without any progress of their initially limited numbers of radio resources. Moreover, the dialog between two base stations makes the associated network infrastructure more complex and slows down the implementation of the radio communication system whose mobility then is restricted.

According to the CSMA/CD (Carrier Sense Multiple Access with Collision Detection) protocol, a node, such as a station, is permanently sensing the shared transmission means for checking the absence of traffic on the carriers from other stations before transmitting the data. The collision detection improves the performance of the CSMA access by stopping the transmission for a random period of time as soon as a transmission collision is detected and reduces the probability of a second collision upon another transmission attempt. Such a protocol is implemented in narrow band systems according to the standard IEEE 802.11, or meeting the WiFi (Wireless Fidelity) label. This invention has in common with the CSMA/CD access, sensing shared radio resources, signalling a data transmission and managing a collision.

SUMMARY

The object of the invention is to have shared in frequency and in time the wide frequency band of a radio communication system by base stations each managing itself autonomously the allocation of radio resources for its own application needs without having such a share of radio resources requiring communications between the base stations.

Accordingly, a method for allocating to an application radio resources amongst radio blocks shared in a predetermined frequency band during a periodic radio frame between base stations, each radio block spreading on frequencies of said band during a time slot of the radio frame and being able to be associated with a communication link between a base station and a mobile station, is characterized in that it includes in a base station in response to quality-of-service parameters required by the application:

estimating occupation rates of the radio blocks during consecutive radio frames, and allocating to the application at least one radio block having an occupation rate less than a threshold and a periodicity expressed in period of frame and depending on the required quality-of-service parameters.

The quality-of-service parameters can be conventionally a flow rate and a maximal allocation duration required to transmit data on an uplink or downlink, or other equivalent parameters. As radio resources are allocated to an application per block in frames, the allocation periodicity for a radio block to be allocated derived from the quality-of-service parameters by the base station is expressed in number of frame period.

Each base station estimates occupation rates of all the radio blocks independently from the other base stations, for the quality-of-service needs of its own applications able to be implemented in the base station and/or in mobile stations attached to the base station. The base stations are autonomous in terms of allocation of radio blocks.

In order to facilitate estimating occupation rates of the radio blocks, each base station or each mobile station can over-amplify predefined radio elements in a radio block allocated to an application included in said each station, each radio block being made of radio elements spread on frequencies of the radio block and equi-distributed in the time slot of the radio block. Over-amplifying predefined radio elements in an allocated radio block can depend on the allocation periodicity of the allocated radio block, or over-amplifying predefined radio elements in any radio block allocated to a station can be constant. Estimating the occupation rate of a radio block can then include measuring a received mean power associated with the over-amplified predefined radio elements of the radio block and a received mean power associated with the other radio elements of the radio block, determining the difference of the measured received mean powers for the radio block in each one of the consecutive radio frames, and determining the average of the mean power differences during the consecutive radio frames constituting the occupation rates. The base stations can sense the close end of the allocation of a radio block by another station thanks to a suppression of the over-amplification of the predefined radio elements in a radio block for a data emission from said other station in at least one radio frame preceding the expiration of an allocation duration. The suppression of the over-amplification results in a decrease of the difference of the received mean powers measured for the radio block that can be detected in the base stations.

According to other characteristics of the method of the invention, allocating a radio block to the requesting application can include selecting iteratively one or several scarcely occupied radio blocks until of radio resource quantities associated with the selected radio blocks and cumulated for a required allocation duration according to the required quality-of-service parameters are at least equal to a required radio resource quantity derived from the required quality-of-service parameters, and for each allocated selected radio block, selecting a first radio frame wherein the allocated selected radio block is a priori unoccupied. The iterative selection of one or several scarcely occupied radio blocks can iteratively include selecting a scarcely occupied radio block in the frames, determining an allocation periodicity to be associated with the selected radio block depending on the occupation rate of the selected radio block and on the required quality-of-service parameters, and determining a quantity of radio resources associated with the selected radio block for the required allocation duration, as long as the sum of the radio resource quantities associated with the selected radio blocks for the required allocation duration is not at least equal to the required radio resource quantity. Selecting a first radio frame for each allocated selected radio block can include selecting any first frame if the allocated selected radio block is unoccupied, and if the allocated selected radio block is partially occupied in consecutive frames, determining a difference of a mean power associated with predefined radio elements of the allocated selected radio block and a mean power associated with the other radio elements of the allocated selected radio block for each one of previous consecutive frames in number equal to the periodicity of the allocated selected radio block, and selecting amongst the previous consecutive frames a first frame for which the difference of mean powers is nil.

Advantageously, the allocation of a radio block can also be based on estimated parameters other than the occupation rates of the radio blocks. For example, in each base station, an average of the received mean powers associated with determined radio elements in each radio block, as so-called "unpredefined" radio elements in the remainder of the description, can be estimated. Such parameters are compared to thresholds able to vary according to the allocation rules. Some of such comparisons can be relative to an estimation of distances between stations. In particular, a radio block is allocatable to the application if the average of mean powers associated with radio elements in the radio block and measured during consecutive radio frames is less than a threshold, whatever the occupation rate of the radio block. Such a radio block able to be allocated has been, a priori, allocated to a base station or a mobile station remote from the base station being to meet the application.

The method of this invention can still include modifying one of the required quality-of-service parameters as a result of an at least partial alteration of the transmission of data of the application within the allocated radio block. Such a lack of response can result from a radio block allocation collision between two stations.

This invention also relates to a radio communication system including base stations and mobile stations for allocating radio resources amongst radio blocks to applications in the stations, the radio blocks being shared in a predetermined frequency band during a periodic radio frame between the base stations, and each radio block spreading on frequencies of said band during a time slot of the radio frame and being able to be associated with a communication link between a base station and a mobile station. The radio communication system is characterized in that, to meet quality-of-service parameters required by an application in a base station, the base station includes:

means for estimating occupation rates of the radio blocks during consecutive radio frames, and means for allocating to the application at least one radio block having an occupation rate less than a threshold and a periodicity expressed in period of frame and depending on the required quality-of-service parameters.

The invention further relates to a base station for allocating to an application radio resources amongst shared radio blocks in a predetermined frequency band during a periodic radio frame between base stations. The base station includes estimating means and allocating means so as to meet quality-of-service parameters required by the application in the base station.

Finally, the invention is relative to a computer program able to be implemented in a base station, said programme comprising instructions that, when the programme is executed in said base station, carry out estimating occupation rates and allocating at least one radio block according to the method of the invention.

BRIEF DESCRIPTION OF THE DRAWINGS

Other features and advantages of the present invention will become more clearly apparent on reading the following description of plural embodiments of the invention given by way of non limiting examples and with reference to the corresponding appended drawings in which.

DETAILED DESCRIPTION

Figure 1:
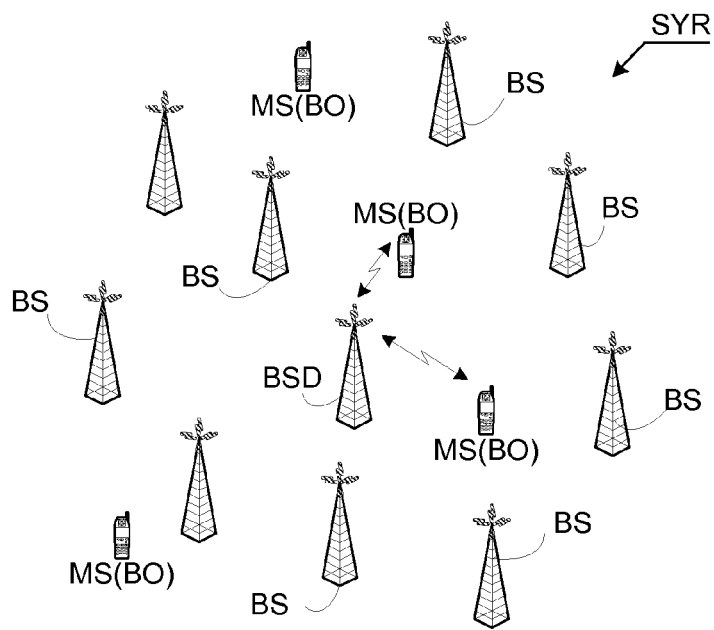
FIG. 1 is a schematic block diagram of a radio communication system according to the invention.

Referring to FIG. 1, a broadband radio communication system SYR according to the invention includes base stations BS and mobile stations MS that communicates with the base stations through shared radio resources in a predetermined wide frequency band $\Delta f[f_{11}, f_{JN}]$. For example, the band $\Delta f$ is of a few MHz for a carrier of a few hundred of MHz. The radio communication system is based on some prerogatives of the WiMAX known technology, of the standard 802.16e/j and of the LTE technology, a radio interface of the OFDMA (Orthogonal Frequency Division Multiple Access) type and some concepts of the CSMA/CD access.

The system SYR does not comprise any centralized management infrastructure of radio resources. The base stations are autonomous and do not contain any means for communicating directly therebetween. Managing associations of mobile stations with a base station is independent from those relating to the other base stations. This allows the radio communication system to be implemented, more particularly, for urgent or temporary communication needs, such as in an "ad hoc" network, by adding, or subtracting, fixed or mobile stations as the mobility of mobile stations extends and as the radio coverage ensured by the system optionally extends.

The frequency band $\Delta f$ to be shared between base stations is fixed. This means that the available frequency bands and the radio resources associated with each base station are limited for a radio frame. Only base stations whose number is variable can establish communications with mobile stations as a function of the availability of the radio resources in the frequency band $\Delta f$ during a radio frame.

Each base station BS is able to estimate the partial or total occupation of radio resources by the other base stations, to thereby allocating available radio resources in the frequency band $\Delta f$ for its own communications with one or more mobile stations thanks to radio resources shared between the base stations. A base station cannot take radio resources another base station has allocated to itself, when those two stations are relatively close. All the base stations have a predetermined maximum emission power and all the mobile stations have a predetermined maximum emission power.

The distribution of frequencies of the predetermined frequency band $\Delta f[f_{11}, f_{JN}]$ in the frequency and time plane (f, t) between active downlinks and uplinks between the stations is based on OFDMA orthogonal frequency division multiple access transmissions. As shown on FIG. 2, the predetermined frequency band $\Delta f[f_{11}, f_{JN}]$ is divided into J frequency channels $C_1$ to $C_J$. Each channel $C_j$ with $1 \leq j \leq J$ comprises N evenly distributed consecutive carrier frequencies $f_{j1} \ldots f_{jn} \ldots f_{jN}$ with a frequency width $\delta f = \Delta f/(J \times N)$, with $1 \leq n \leq N$. During a time slot $M \times \delta t$ of M consecutive elementary time intervals $\delta t$, J radio blocks $BR_{1p}$ to $BR_{Jp}$ associated with J channels $C_1$ to $C_J$ and each having N strings of radio elements $ER_{1njp}$ to $ER_{Mnjp}$ of a duration $\delta t$, associated with N respective consecutive frequencies $f_{j1}$ to $f_{jN}$ can be allocated respectively to at the most J base stations for links with mobile stations, with $1 \leq m \leq M$. An radio element $ER_{mnjp}$ associated with a respective frequency defines the smallest allocation unit during which a base station can exchange data at the respective frequency with a mobile station on an uplink according to the direction from the mobile station to the base station or on a downlink according to the direction from the base station to the mobile station. For the duration $\delta t$ and on a frequency $f_{jn}$, a data symbol for a communication link with characteristics depending on the flow rate and on the type of modulation used for the communication can be transmitted. For example, the modulation is a PSK phase shift keying modulation or a quadrature amplitude modulation QAM16 or QAM64 with several amplitude levels. Different types of modulation can be used for a single radio block for signalling, traffic data and pilots.

Figure 2:
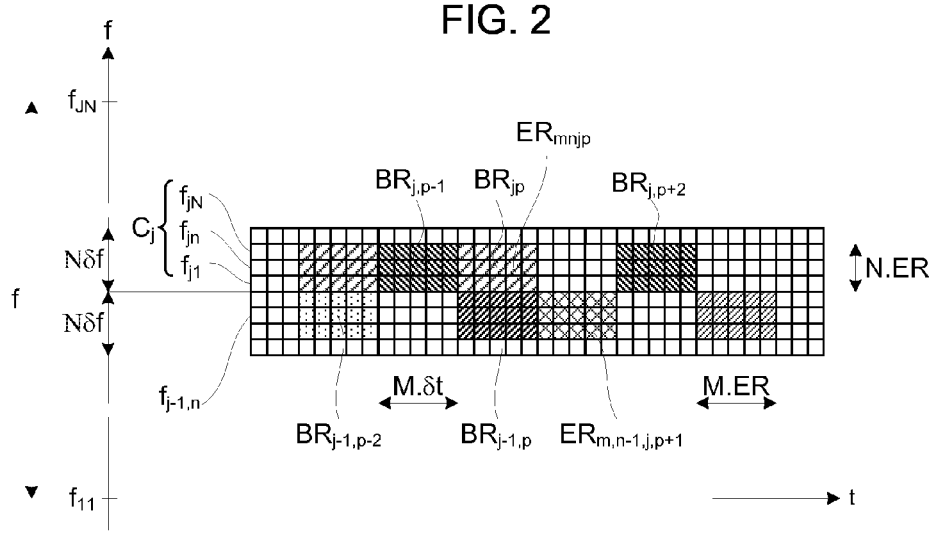
FIG. 2 is a diagram illustrating the time and frequency distribution of radio blocks in two channels.

A radio block $BR_{jp}$ with $M \times N$ radio elements and represented by a rectangle on FIG. 2, wherein M and N are supposed to be equal to 5 and 3, defines during a time slot $M \times \delta t$ the smallest radio resource that can be allocated to an application in a base station or a mobile station for emitting or receiving user data on a communication link. An APR application in a base station can require a radio block to be allocated for communicating data through a downlink from the base station to a mobile station, and another radio block to be allocated for communicating data through an uplink from the mobile station to the base station. Conversely, an application APR in a mobile station can require a radio block to be allocated for communicating data through an uplink from the mobile station to a base station, and another radio block to be allocated for communicating data through a downlink from the base station to the mobile station. For example, an application is a software module for processing user data whose communication is required by the application and that are relative to voice, or to video, or that are specific to any interactivity between a base station and a mobile station, as a station location on a map. The applications in the stations thus have different quality-of-service needs, more specifically, in terms of quantity and periodicity of radio resources and communication duration.

The association of a radio block to an uplink or a downlink is decided by each base station BS. If the system SYR operates in a FDD (Frequency Division Duplex) mode, the base station BS simultaneously emits and receives in at least two blocks of two different frequency channels respectively associated with the uplink and the downlink of a communication with a mobile station MS. If the system SYR operates in a TDD (Time Division Duplex) mode, the base station BS emits and receives during different time slots $M \times \delta t$ in at least two radio blocks belonging to a common frequency channel and respectively associated with the downlink and the uplink of a communication with a mobile station MS.

Figure 3:
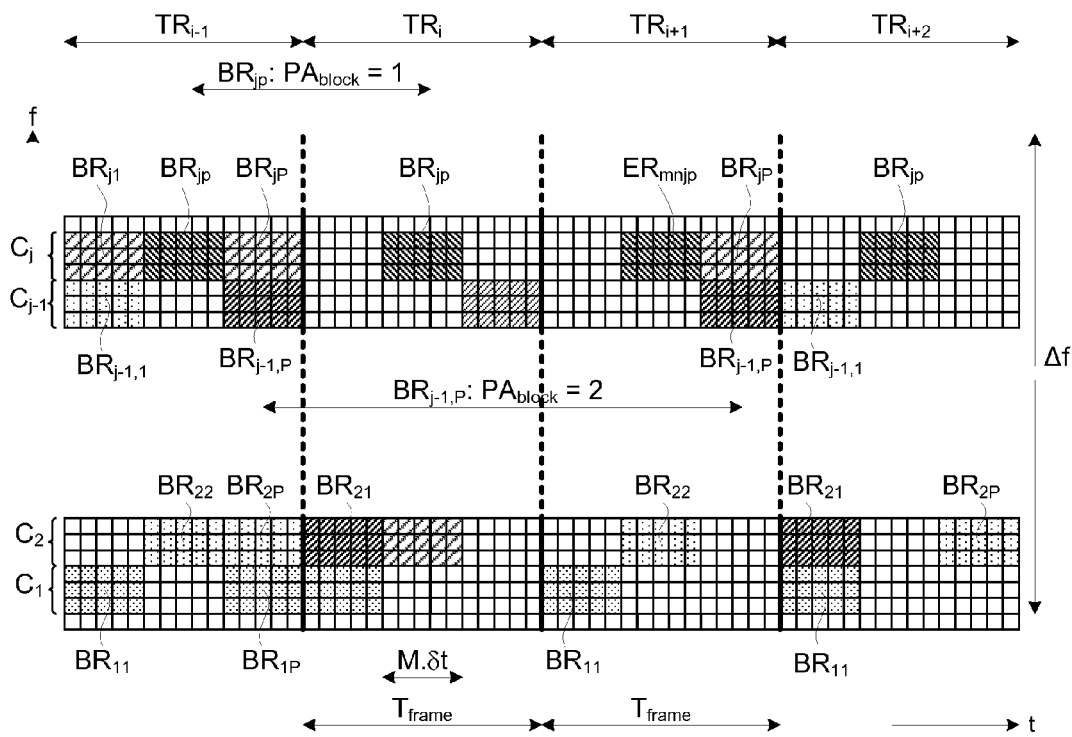
FIG. 3 shows a diagram with the time and frequency distribution of radio blocks in radio frames according to the invention.

The data transmission in the radio communication system is structured, not only into blocks, but also into radio frames $TR_i$ of a period $T_{frame} = P(M \times \delta t)$, as shown on FIG. 3. Each frame $TR_i$ comprises a predetermined number $J \times P$ of radio blocks $BR_{11}$ to $BR_{JP}$ distributed into P columns. Each column has a duration $M \times \delta t$ and contains J radio blocks. A base station for transmitting data to a mobile station or receiving data from the mobile station can periodically allocate at least one available radio block $BR_{jp}$ having the same position marked by indicia j and p in frames offering an allocation periodicity $PA_{block}$ expressed in a number of consecutive frame periods $T_{frame}$. According to examples, in consecutive frames $TR_{i-1}$, $TR_i$, $TR_{i+1}$ and $TR_{i+2}$ shown on FIG. 3 wherein the number P of block columns per frame is supposed to be equal to 3, a block $BR_{11}$ with a block allocation periodicity $PA_{block}$ of a period of frame $T_{frame}$ and a block $BR_{1p}$ with a periodicity $PA_{block} = 6 \, T_{frame}$, or a block $BR_{22}$ with a periodicity $PA_{block} = 2 \, T_{frame}$ and two blocks $BR_{j-1,1}$ and $BR_{2P}$ each with an allocation periodicity $PA_{block} = 3 \, T_{frame}$ are allocated to a request of a first application for a communication link;

a block $BR_{jp}$ with a periodicity $PA_{block} = 1 \, T_{frame}$, or two blocks $BR_{21}$ and $BR_{j-1,P}$ every two frames and thus with a periodicity $PA_{block} = 2 \, T_{frame}$ are allocated to a request of a second application for a communication link;

a block $BR_{jP}$ with a periodicity $PA_{block} = 2 \, T_{frame}$, or two blocks $BR_{22}$ and $BR_{j1}$ with a periodicity $PA_{block} = 4 \, T_{frame}$ are allocated to a request of a third application for a communication link.

Figure 4:
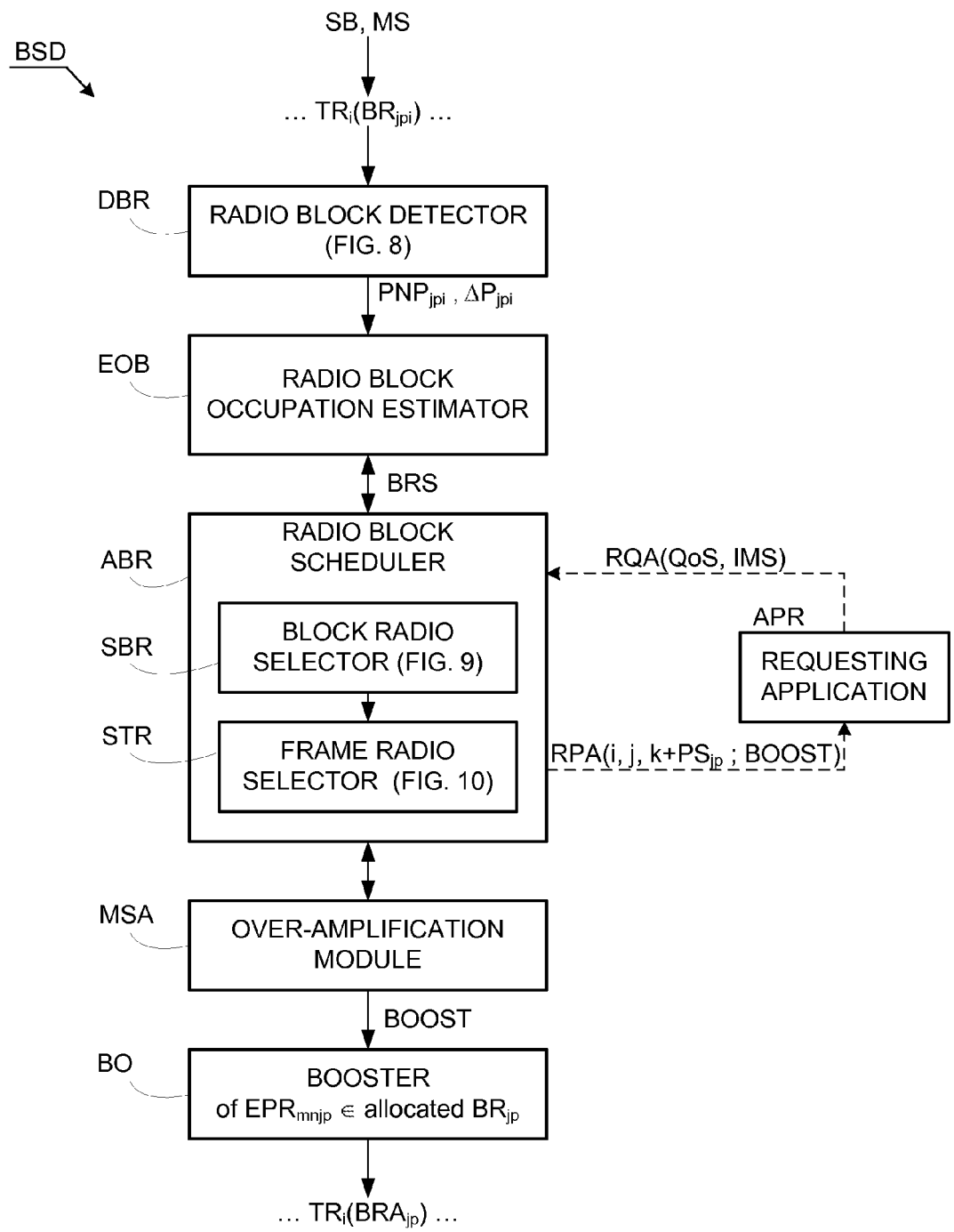
FIG. 4 is a schematic block diagram of a base station of the radio communication system.

All the base stations being identical, reference will be made in the remainder of the description to a given base station BSD shown on FIG. 4. The base station BSD includes functional blocks most of which provide functions having a relationship with this invention and can correspond to software modules implemented in at least one processor and/or to dedicated or programmable hardware modules. The functional blocks are, more particularly, a radio block detector DBR, a radio block occupation estimator EOB, a radio block scheduler ABR, an over-amplification module MSA and a booster BO. The scheduler ABR includes a radio block selector SBR and a radio frame selector STR. Each mobile station MS further includes a booster BO for uplink.

The allocation periodicity and duration for a radio block depend on radio resource needs of a requesting application APR implemented in the base station BSD, or in a mobile station MS having to communicate with the base station BSD, and are defined as a function of known quality-of-service parameters QoS for data to be communicated, such as a flow rate DB and an allocation duration DAR required for an uplink or a downlink and optionally the distance between stations.

For requiring a resource radio, the application APR in the station BSD or MS transmits to the radio block scheduler ABR in the station BSD a radio resource allocation request RQA including the quality-of-service parameters QoS(DB, DAR) for a communication link. The station BSD derives therefrom an allocation periodicity $PA_{block}$ for each block to be allocated expressed in a number of frame periods $T_{frame}$ that is at least equal to 1. The allocation request also includes the identifier IMS of the mobile station MS that has to communicate with the base station BSD by the communication link. The radio modulation type for the communication link is determined by the base station BSD.

When plural radio blocks are to be allocated in response to a request RQA, the allocations of the radio blocks are independent. In particular, plural radio blocks able to have different periodicities for meeting the required parameters for an uplink or a downlink, such as for example for the first link set forth above, can be allocated to a single allocation request.

Figure 5:
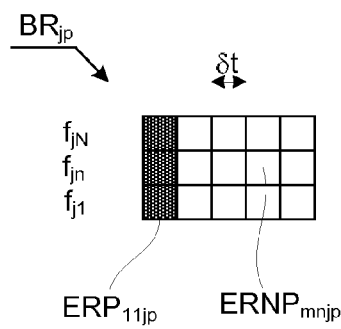
FIGS. 5 and 6 are radio blocks respectively with predefined radio elements differently distributed.
Figure 6:
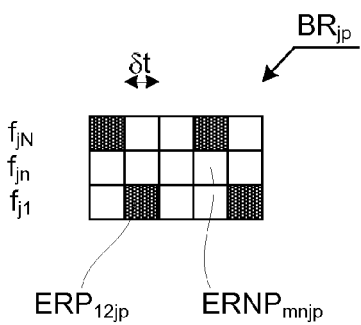

The booster BO in a base station BS or a mobile station MS is adapted for over-amplifying (boosting) the emission power of predefined radio elements $ERP_{mnjp}$ comparatively to the other radio elements, referred to as un-predefined radio elements $ERNP_{mnjp}$, in an allocated radio block $BR_{jp}$ so that each one of the base stations is able to detect radio blocks allocated to other base stations and other mobile stations in the frames, as will be seen hereinafter. The over-amplified predefined radio elements $ERP_{mnjp}$ can be for example:

the radio elements of a column having the width δt in the allocated radio block $BR_{jp}$, as the radio elements of the first column of the block $BR_{jp}$ shown on FIG. 5, or specific radio elements having predetermined positions in the block $BR_{jp}$ as shown on FIG. 6, for example, reference or synchronization pilot elements, for example, analogous to those according to the LTE technology or other radio elements.

After the scheduler ABR in the given base station BSD has allocated radio blocks in response to the allocation request RQA transmitted by the requesting application APR, the booster BO in the station including the requesting application APR having received an accepted allocation response RPA increases by ΔP the emission power of the predefined radio elements $ERP_{mnjp}$ of all the radio blocks to be emitted in the frames, allocated to this application. The over-amplified power of the predefined radio elements is determined by the over-amplification module MSA in the base station. The module MSA determines an over-amplifying parameter BOOST according to one of first and second next over-amplifying methods and introduces it in the allocation response RPA to the application APR.

According to the first over-amplifying method, the module MSA distributes an mean excess EXP of available emission power in the station having transmitted the allocation request RQA proportionally to the allocation periodicities of allocated radio blocks. The power excess EXP depends on the difference between the predetermined maximum emission power of the station and the sum of the emission powers for all the radio blocks allocated to the station in average per frame, based on a constant emission power for all the radio elements of the allocated blocks. For example, if an allocated block $BRS_{jp}$ is allocated with an allocation periodicity $PA_{block}$, i.e. a block allocated all the $PA_{block}$ consecutive frames, the over-amplification parameter BOOST is $1/PA_{block}$ of the power excess EXP for the predefined radio elements $ERP_{mnjp}$ in the allocated and not allocated blocks of all the frames having the same location as that of the allocated block $BRS_{jp}$. According to another example, if first and second blocks are allocated respectively with allocation periodicities of 2 and 3, i.e. every two frames or every three frames, the over-amplification parameters BOOST are ½ and ⅓ fractions of the power excess EXP for the predefined radio elements $ERP_{mnjp}$ in the allocated and not allocated blocks of all the frames having the same locations as those of the first and second allocated blocks.

According to the second over-amplifying method, the module MSA imposes a constant over-amplification gain parameter BOOST identical for all the predefined radio elements $ERP_{mnjp}$ in each allocated block $BRS_{jp}$ to the station having transmitted the allocation request RQA, whatever the allocation periodicity of the block. For example, the parameter BOOST is proportional to the ratio of the available power minimum excess EXP in the station on the maximum number of blocks able to be allocated to the station for a predetermined duration.

In order that the other base stations detect the end of the emission of a block allocated in frames by a base station, the over-amplification module MSA in the station including the requesting application APR suppresses the over-amplification of the predefined radio elements $ERP_{mnjp}$ of the block allocated in one or more last frames at the expiration of the allocation duration indicated in the allocation request RQA. The number of last frames with the allocated block having non over-amplified predefined radio elements can be proportional to the allocation duration.

The base station BSD checks the occupation of radio blocks in the frames with the predetermined frequency band $\Delta f[f_{11}, f_{JN}]$ by means of the received radio block detector DBR. At each block period $T_{frame}/P$ in each radio frame $TR_i$ and for each frequency channel $C_1, \ldots C_j, \ldots C_J$, and therefore for each radio block $BR_{jp}$, in each frame $TR_i$, the detector DBR measures a received mean power $PP_{jpi}$ associated to the predefined radio elements $ERP_{mnjp}$ in the radio block $BR_{jp}$ and a received mean power $PNP_{jpi}$ associated with the un-predefined radio elements $ERNP_{mnjp}$ in the radio block $BR_{jp}$ and determines the difference of the measured received mean powers $\Delta P_{jpi} = PNP_{jpi} - PP_{jpi}$. The powers $PNP_{jpi}$ and $\Delta P_{jpi}$ in association with the block indicia j and p and the index i for each frame $TR_i$ are written in memory in the radio block occupation estimator EOB of the base station BSD.

When the radio communication system SYR operates in the FDD frequency division duplex mode, the base station BS emits and receives in different frequency channels during the same time slot M×δt on the downlink and uplink of a communication with a mobile station; the detector DBR in the base station is not able to detect the power emitted by the other stations of the system during this time slot. When the radio communication system operates in a TDD time division duplex mode, the downlink and uplink of a communication with the base station BSD share the same frequency channel for different time slots separated by transition time intervals; the detector DBR in the base station is able to detect the power emitted by the other stations of the system except during the time slots allocated to the emission on the downlink. In these two modes, the detector DBR in the base station BS measures the received powers associated with radio blocks when the detector DBR is able to detect itself the power emitted by the other stations.

For the radio block detector DBR to acquire measured received powers associated with all the radio blocks of each frame even when the base station BS is unable to detect the power emitted by other stations, one of the two following power measurement solutions is implemented.

According to the first solution, the base station BSD postpones some emissions of data so that the detector DBR measures received mean powers associated with the radio elements ERP and ERNP in the radio blocks emitted by other stations. Before the emission of radio blocks is postponed by the base station BSD, the over-amplification module MSA within the latter removes the over-amplification of predefined radio elements $ERP_{mnjp}$ of the allocated block or the allocated blocks in one or more frames for preliminarily signalling the postponement of the emission to other neighbouring base stations located under the radio coverage of the base station BSD. This preliminary emission postponement signalling reduces the number of base stations deciding to postpone at the same time their emissions.

According to the second solution, the base station BSD controls one or more mobile stations communicating with the base station, to measure received powers associated with radio elements in radio blocks emitted by other stations and to transmit the measured powers to the base station BS, whether the detector DBR is able or unable to detect the power emitted by the other stations.

When all the received powers associated with all the radio blocks in I consecutive frames $TR_1$ to $TR_I$ have been measured and stored, the radio block occupation estimator EOB in the base station BSD stores them for using them in a periodic estimation of the mean occupation of radio blocks by the other stations in the I frames in active links. The integer I is more than 1 and can be at least equal to the highest acceptable block periodicity $PA_{block}$. Thus, each base station BS is able to establish a mapping in the form of an occupation rate table of dimensions J×P reflecting the occupation, the partial occupation and the inoccupation of the radio blocks in average per period of frame in I consecutive frames for the share frequency band $\Delta f[f_1, f_N]$. The period of the estimation can be that $T_{frame}$ of the radio frames or a few periods of radio frame.

The estimator EOB estimates in the set of I consecutive radio frames the average $M\Delta P_{jp}$ of the differences $\Delta P_{jpi} = PP_{jpi} - PNP_{jp}$ of the measured received powers in the radio frames $TR_1$ to $TR_I$ for the predefined radio elements $ERP_{mnjp}$ and un-predefined radio elements $ERNP_{mnjp}$ of each radio block $BR_{jp}$:

$$M\Delta P_{jp} = \Sigma_{i=1}^{i=I} \Delta P_{jpi}/I.$$

The average $M\Delta P_{jp}$ is compared for example to two thresholds of power difference average $S\Delta P1$ and $S\Delta P2$ such that $S\Delta P1 < S\Delta P2$ by the estimator EOB for deriving therefrom the occupation rate of the radio block $BR_{jp}$ that is classified into one of the three following occupation classes:

CO1: low occupation rate if $M\Delta P_{jp} \leq S\Delta P1$, indicating that the radio block $BR_{pj}$ is scarcely occupied in the frames $TR_1$ to $TR_I$, as a block with an allocation periodicity $PA_{block}$ scarcely lower or equal to I; when $M\Delta P_{jp}=0$, the radio block $BR_{jp}$ is unoccupied, i.e. not allocated by any base station, and thus completely available; or CO2: moderate occupation rate if $S\Delta P1 < M\Delta P_{jp} \leq S\Delta P2$, indicating that the radio block $BR_{jp}$ is moderately occupied in the frames $TR_1$ to $TR_I$, as a block with an allocation periodicity $PA_{block}$ close to I/2; or CO3: high occupation rates if $S\Delta P2 < M\Delta P_{jp}$, indicating that the radio block $BR_{jp}$ is very occupied in the frames $TR_1$ to $TR_I$, as a block with an allocation periodicity $PA_{block}$ equal to or scarcely higher than 1.

Alternatively, the thresholds $S\Delta P1$ and $S\Delta P2$ are equal and the occupation rates are estimated as low or high in two occupation classes.

The estimator EOB also estimates the average $MPNP_{jp}$ of the received mean powers $PNP_{jpi}$ associated with the un-predefined radio elements $ERNP_{mnjp}$ in each radio block $BR_{jp}$ and measured every I consecutive radio frames:

$$MPNP_{jp} = \Sigma_{i=1}^{i=I} PNP_{jpi}/I.$$

The average $MPNP_{jp}$ is compared for example to two mean power thresholds SPNP1 and SPNP2 such that SPNP1>SPNP2 by the estimator EOB for approximately deriving therefrom the mean distance $D_{jp}$ between the given base station BSD and the station or the stations having introduced data in the radio block $BR_{jp}$ during the I consecutive radio frames. The mean distance $D_{jp}$ is classified in one of the three following distance classes:

CD1: small distance if $SPNP1 \leq MPNP_{jp}$, indicating that the station or the stations having emitted the radio block $BR_{jp}$ are very close to the base station BSD;

CD2: intermediary distance if $SPNP2 \leq MPNP_{jp} \leq SPNP1$, indicating that the station or the stations having emitted the radio block $BR_{jp}$ are neither too close, nor too remote from the base station BSD;

CD3: high distance if $MPNP_{jp} \leq SPNP2$, indicating that the station or the stations having emitted the radio block BRjp are very remote from the base station BSD.

Alternatively, the thresholds SPNP1 and SPNP2 are equal and the distance is estimated small or high in two distance classes. According to another alternative, the estimator EOB compares the average $MPNP_{jp}$ to a lot of thresholds for more accurately estimating the distance $D_{jp}$ of the stations having emitted the radio block $BR_{jp}$ so as to locate them on a map.

The estimator EOB delivers the indicia of the radio blocks j and p of the radio blocks $BR_{jp}$ with the occupation rate and distance class parameters $CO_{jp}$ and $CD_{jp}$ for the frames $TR_1$ to $TR_I$ to the radio block scheduler ABR. The radio block scheduler ABR thus periodically stores a radio block mean-occupation table TBR in time and frequency for the frames $TR_1$ to $TR_I$.

The scheduler ABR in the given base station BSD can accept or refuse the radio resource allocation request RQA provided by the application APR. For example, if unoccupied and scarcely occupied radio blocks in the class CO1 meet the required quality-of-service parameters QoS(DB, DAR) included in the request RQA, the scheduler ABR selects one or more radio blocks in the frames as a function of quality-of-service parameters, accepts the request and transmits to the application an allocation response RPA including for each allocated radio block the indicia p and j, the allocation periodicity of the allocated radio block and the number of a first selected frame whose the allocated radio block will contain user data, and the identifier IMS of the mobile station MS that has to communicate with the base station BSD. If several radio blocks are to be allocated in frames in response to the request RQA, the scheduler ABR allocates each radio block independently from the others. This means that radio blocks in plural consecutive frames allocated to an application can be distributed into said plural consecutive frames according to different respective allocation periodicities, such as for the examples of allocated block distribution shown on FIG. 3.

More generally, the estimator EOB periodically updates the radio block occupation table and extracts from this table selectable radio blocks BRS that are able to be allocated, according to predetermined allocation rules relating to classes CO1 to CO3 and CD1 to CD3, and that make up a list LBRS. The list LBRS is supplied to the radio block scheduler ABR to allocate one or more radio blocks to the request RQA as a function of quality-of-service parameters QoS(DB, DAR) of the latter. For example, the estimator establishes a list LBRS containing the radio blocks having relatively low occupation rates belonging to the class CO1 or to the classes CO1 and CO2, and adds to this list the radio blocks emitted by stations relatively remote from the base station BSD and for which the distances belong to the class CD3 or to the classes CD2 and CD3, whatever their occupation rates. Indeed, the added radio blocks have relatively low interferences with such radio blocks to be allocated by the base station BSD.

According to another alternative, the occupation rate thresholds S$\Delta$P1 and S$\Delta$P2 and/or the distance thresholds SPNP1 and SPNP2 are varying every I consecutive frames $TR_1$ to $TR_I$. For example, if the number of radio blocks in the selectable radio block list LBRS based on the class CO1 is insufficient for a selection of blocks in response to one or more refused requests RQA, the scheduler ABR controls the estimator EOB to increase progressively the threshold S$\Delta$P1 until threshold S$\Delta$P2.

A contrario, the scheduler ABR refuses the allocation request RQA if the list LBRS is empty, or if one or several blocks in the list LBRS can not meet the quantity of radio resources QR derived from the quality-of-service parameters QoS(DB, DAR) in the request.

As a result of the estimation of occupation rates according to the invention, the estimators in the base stations BS establish radio block occupation tables and selectable radio block lists that are different and independent one from each other as the tables and the lists depend on different reception powers and different distances between the stations.

Figure 7:
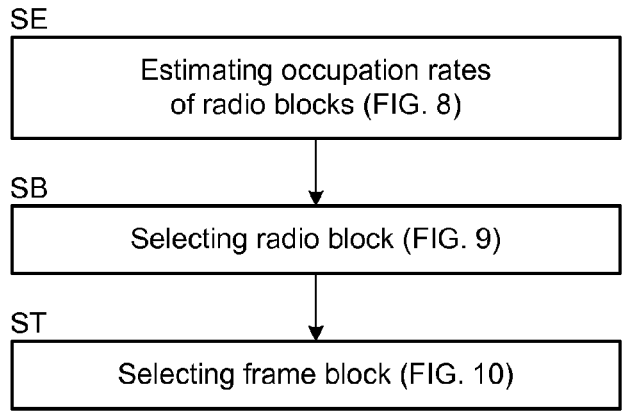
FIG. 7 is an algorithm of the radio resource allocation method according to the invention.

The radio resource allocation method embodying the invention in the given base station BSD includes a selection SB of radio block to be allocated and a selection ST of radio frames in response to an allocation request RQA transmitted by a requesting application APR, after an estimation SE of the occupation rates of the radio blocks and an establishment of selectable radio block list LBRS by the base station BSD, as shown on FIG. 7.

Figure 8:
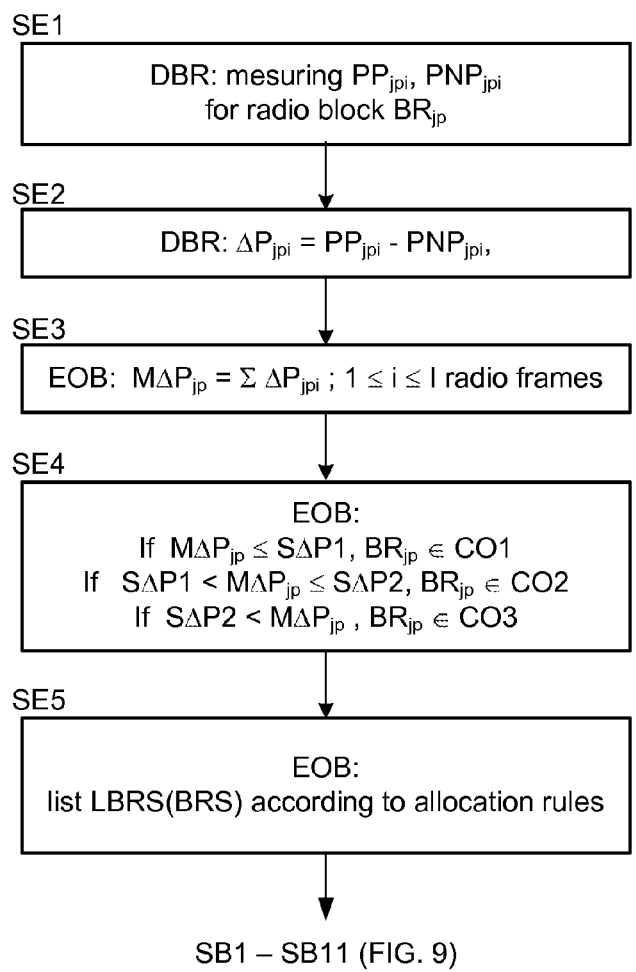
FIG. 8 is an estimation algorithm for occupation rates in radio blocks, included in the radio resource allocation method according to the invention.

As previously described, the estimation of the occupation rates of all the radio blocks $BR_{11}$ to $BR_{JP}$ includes at least the following steps SE1 to SE4 shown on FIG. 8 for each radio block $BR_{jp}$:

SE1: in the radio block detector DBR, measuring the received mean power $PP_{jpi}$ associated with the predefined radio elements $ERP_{mnjp}$ and the received mean power $PNP_{jpi}$ associated with the un-predefined radio elements $ERNP_{mnjp}$ in the radio block $BR_{jp}$ in each one of I consecutive radio frames $TR_1$ to $TR_I$;

SE2: in the detector DBR, determining the difference of the measured received mean powers $\Delta P_{jpi} = PP_{jpi} - PNP_{jpi}$;

SE3: in the radio block occupation estimator EOB, estimating the occupation rate per period of frame made up by the mean $M\Delta P_{jp}$ of the differences of the measured received powers $\Delta P_{jp\,i} = PP_{jpi} - PNP_{jpi}$ in the radio frames $TR_1$ to $TR_I$; and SE4: in the estimator EOB, classifying the radio block $BR_{jp}$ into the classes CO1 to CO3 through a comparison of the occupation rate to the power difference mean thresholds S$\Delta$P1 and S$\Delta$P2.

Finally, in a step SE5, the estimator EOB establishes a table of the occupation rates of the radio blocks $BR_{11}$ to $BR_{JP}$ and a list LBRS of unoccupied or scarcely occupied selectable radio blocks BRS chosen in the table according to predetermined allocation rules relating to the classes CO1 to CO3. Optionally, the blocks are classified into the distance classes CD1 to CD3 in step SE4 and the allocation rules are also based on the distance classes in step SE5.

Figure 9:
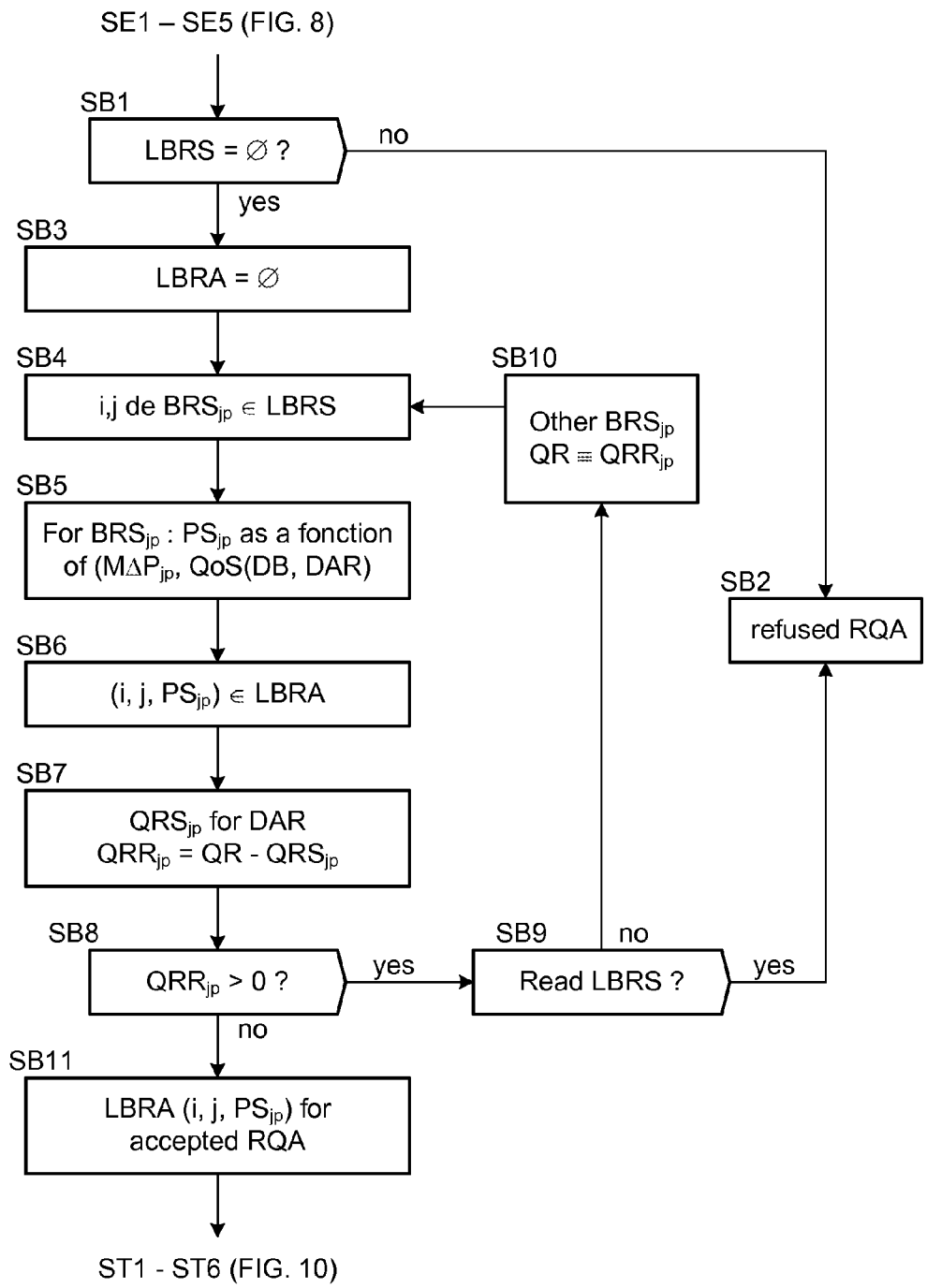
FIG. 9 is a radio block selection algorithm included in the radio resource allocation method according to the invention.

The radio block selection includes steps SB1 to SB11 shown on FIG. 9.

In step SB1, the radio block selector SBR examines the content of the selectable radio block list LBRS. If the list LBRS is empty, the scheduler ABR refuses the allocation request in step SB2. Otherwise, the scheduler ABR establishes an empty list LBRA of radio block to be allocated to the request RQA, in step SB3.

The selector SBR actives a random number generator in the scheduler in step SB4 for randomly obtaining the indicia j and p of a selected radio block $BRS_{jp}$ amongst those of the list LBRS comprising unoccupied and scarcely occupied selectable radio blocks. The selector SBR points to the block $BRS_{jp}$ in the list LBRS as a function of the randomly selected indicia j and p. The selector SBR reads the occupation rate $M\Delta P_{jp}$ of the selected radio block $BRS_{jp}$ and the quality-of-service parameters QoS(DB, DAR) extracted from the request RQA for deriving therefrom a minimum allocation periodicity $PS_{jp}$ to be associated to the selected radio block $BRS_{jp}$, in step SB5. The indicia of the block $BRS_{jp}$ and the periodicity $PS_{jp}$ are stored in association in the list LBRA to be established for the request RQA, in step SB6. The selector SBR derives a quantity of radio resources $QRS_{jp}$ of the selected radio block $BRS_{jp}$ depending on the allocation periodicity of the block $PS_{jp}$ and capable to be allocated for the required allocation duration DAR from the required quantity of radio resources QR=DB$\times$DAR so as to derive therefrom a remaining quantity of radio resources $QRR_{jp} = QR - QRS_{jp}$, in step SB7.

If the remaining quantity $QRR_{jp}$ is strictly positive in step SB8, i.e. if the required quantity of radio resources QR is not completely allocated, and if there is at least one block left to be processed in the list LBRS in step SB9, the quantity QR is put equal to $QRR_{jp}$ in step SB10 and the radio block selection goes back to step SB4 for trying to allocate another radio block. The steps SB4 to SB9 are repeated for selecting in the list LBRS one or more other blocks $BRS_{jp}$ to be added to the list LBRA so as to meet the remaining quantity of radio resources QRR.

If in step SB9, the list LBRS has been completely read, the remaining quantity $QRR_{jp}$ being positive, the block or the blocks read in the list LBRS are insufficient for meeting the required parameters QoS(DB, DAR); the request RQA is refused in step SB2. According to the already mentioned alternative, after the refused request, the scheduler ABR controls the estimator EOB to increase progressively the threshold S$\Delta$P1 and thus the number of selectable radio blocks in the list LBRS.

If $QRR_{jp} \leq 0$ in step SB8, the sum of the radio resource quantities associated with the allocated radio blocks $BRA_{jp} \equiv BRS_{jp}$ in the list LBRA and determined for the required allocation duration DAR is at least equal to the required radio resource quantity QR=DB$\times$DAR. The selector SBR associates the allocated blocks $BRA_{jp}$ of the list LBRA with the request RQA, in step SB11, which means that the scheduler accepts the request RQA.

The radio frame selection includes steps ST1 to ST6 and follows step SB11 for introducing each allocated radio block $BRA_{jp}$ in the previously established list LBRA. The radio frame selector STR of the given base station BSD is adapted to select a first radio frame wherein the radio block $BRA_{jp}$ allocated to the requesting application APR is a priori unoccupied.

In step ST1, the selector STR analyzes the occupation rates of the allocated block $BRA_{jp}$ represented by the average $M\Delta P_{jp}$ of the stored received power differences established by the estimator EOB for previous consecutive radio frames $TR_1$ to $TR_I$. If $M\Delta P_{jp}=0$, the allocated block $BRA_{jp}$ is not occupied by other stations and the selector STR starts the allocation by any following frame, for example, the first following frame, in step ST2. If $M\Delta P_{jpi} \neq 0$, the allocated block $BRA_{jp}$ is partially occupied in I consecutive frames by other stations. In step ST3, the radio block detector DBR transmits to the selector STR the measured received mean power differences $\Delta P_{jpi} = PP_{jpi} - PNP_{jpi}$ of the allocated block $BRA_{jp}$ in at the most $PS_{jp}$ last previous frames $TR_i$ to $TR_{i+PSip-1}$. $PS_{jp}$ is the periodicity of the allocated block $BRA_{jp}$ that has been determined by the selector SBR. In step ST4, the selector SBR looks for, amongst the previous frames $TR_i$ to $TR_{i+PSip-1}$, the frame $TR_k$ for which the difference $\Delta P_{jpk}$ for the selected block $BRS_{jp}$ is nil, with $i \leq k \leq i+PS_{ip}-1$, and consequently, in which the allocated block $BRA_{jp}$ is unoccupied. As soon as the frame $TR_k$ is found, the selector SBR adds its indicia k to the periodicity $PS_{jp}$ in step ST5 and the selector STR ends the allocation of the selected block by introducing the index $k+PS_{jp}$ in the allocation response RPA, in step ST6. The station BSD or a mobile station MS where the requesting application APR is implemented can then insert data in the allocated block $BRA_{jp}$ of a first frame having the index $k+PS_{jp}$ that follows the frame $TR_k$ and wherein the block $BRA_{jp}$ is a priori unoccupied.

Sets of steps ST1 to ST6 are executed independently one from the other by the selector STR respectively for the allocated blocks $BRA_{jp}$ of the list LBRA so as to allocate them individually in the frames with a requesting application APR as a function of their periodicities $PS_{jp}$. If at least one of the allocated blocks is occupied, an allocation collision occurs and a hereinafter described procedure for repeating an allocation request is executed.

In a step SR1, the given base station BSD transmits to the station containing the requesting application APR an allocation response RPA including triplets (j, p, $k+PS_{jp}$) associating with indicia j and p of the allocated radio blocks $BRA_{jp}$ the indicia $k+PS_{jp}$ of the first frames that are to contain data in these blocks. The over-amplification parameter BOOST determined according to one of first and second previously described methods by the module MSA is also introduced in the response RPA. The booster BO in the station containing the requesting application APR over-amplifies the power of predefined radio elements $ERP_{mnjp}$ of all the radio blocks that have been allocated to the application APR and that are to be emitted according to their periodicities in the frames, in a step SR2.

Figure 10:
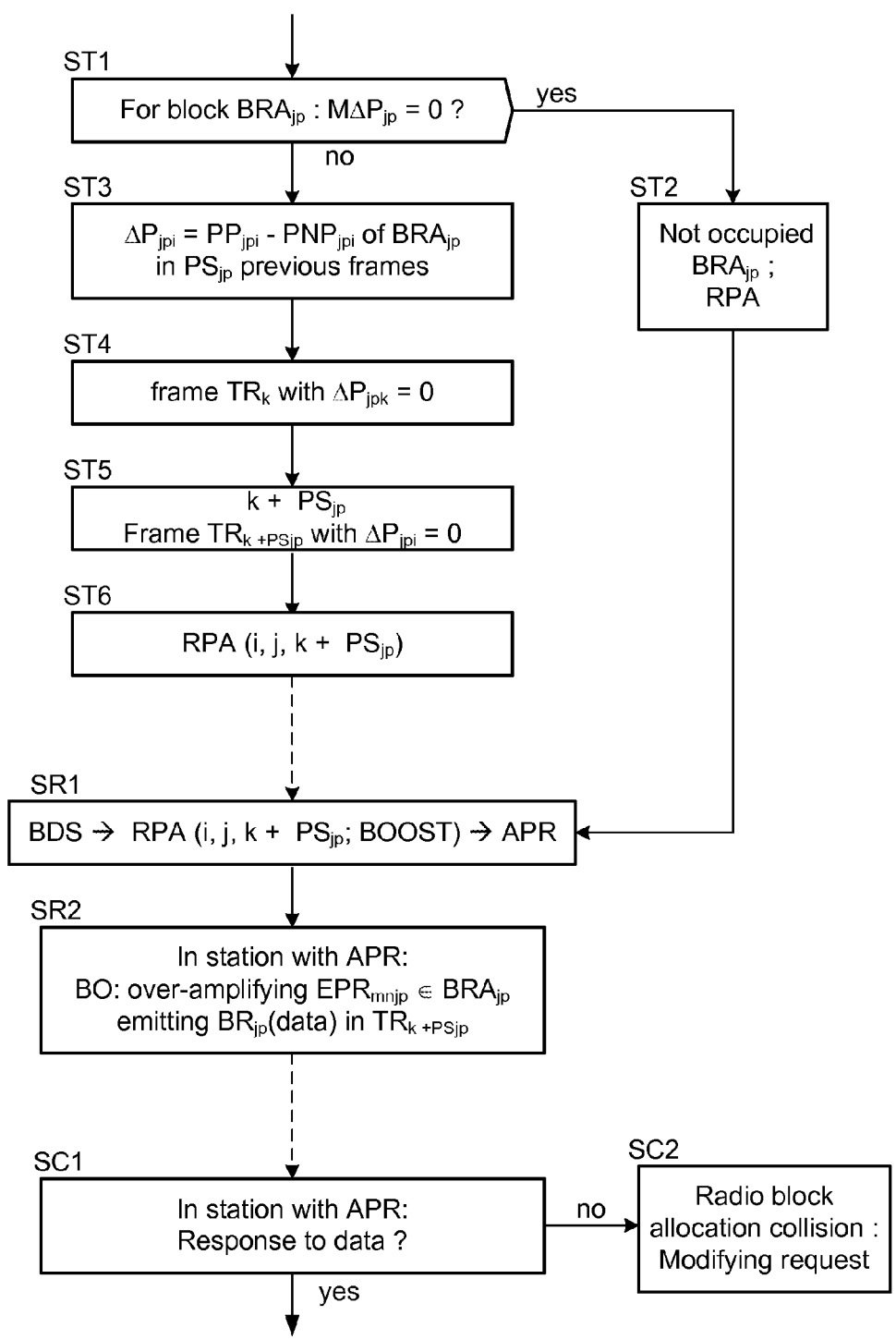
FIG. 10 is an algorithm more specifically relative to a radio frame selection, included in the radio resource allocation method according to the invention.

The radio resource allocation method of the invention makes use of an allocation request repeating procedure HARQ (Hybrid Automatic Repeat reQuest) also shown on FIG. 10, to overcome an allocation collision between at least two stations. Such a procedure takes place in each one of the two stations wherein applications have transmitted user data mixed in a common allocated radio block of a radio frame. If the application in a station in collision has not received an acknowledgement of the transmitted user data, the application in this station controls a retransmission of the user data for a predetermined number of time at least equal to 1.

For example, if during a predetermined period of time, acknowledgements in a predetermined number have only been received each after a first predetermined number of repetition of the transmission of user data, or if no acknowledgement has been received after a second predetermined number of repetition of the transmission of user data higher than the first predetermined number, in a step SC1, such a partial or total alteration of the transmission of data results in the application modifying at least one of its quality-of-service parameters QoS(DB, DAR) in its allocation request RQA. The modification of the allocation request allows the application to request the allocation of one or several radio blocks different from that or those previously allocated to the application to the base station BS associated with the application, in a step SC2. For example, if the reception of user data has failed with a modulation QAM64, the associated base station BS decides to impose another type of radio modulation corresponding for example to the modulation QAM16 in response to a decreased required flow rate DB included in the modified request RQA. Such changes of required flow rate and modulation type lead to another required quantity of radio resources QR and a selection of one or several other radio blocks allocated with different allocation periodicities and selected amongst the radio blocks of a selectable radio block list established in response to the received modified request by the scheduler ABR of the associated base station BS. In order to still avoid an allocation collision in the two conflicting stations, the response to the modified request contains for an allocated radio block the index of a first radio frame that is determined according to the allocation method according to this invention and to which there is added a random number of some periodicities of the allocated radio block, for example less than 10. If the failure of the retransmitted user data is a result of a conflict of radio block allocation between the two stations, the probability of another conflict of radio block allocation according to the parameters of said other request is then low.

The invention described here relates to a method and a base station for allocating radio resources. According to an implementation, the steps of the method of the invention are determined by the instructions of a computer program incorporated in the base station. The program adapted to be implemented in the base station according to the invention includes program instructions, which when said program is executed in the base station whose operation is then controlled by the execution of the program, carry out the steps of the method according to the invention.

Consequently, the invention also applies to a computer program, in particular a computer program stored on or in a storage medium readable by a computer and by any data processing device adapted to implement the invention. This program can use any programming language and take the form of source code, object code, or an intermediate code between source code and object code, such as a partially compiled form, or any other form desirable for implementing the method according to the invention. The program can be downloaded in the base station via a telecommunication network, as internet.

The storage medium can be any entity or device capable of storing the program. For example, the medium can include storage means in which the computer program according to the invention is stored, such as a ROM, for example a CD ROM or a microelectronic circuit ROM, a USB key, or magnetic storage means, for example a hard disk.

The invention claimed is:

1. A method for allocating, to an application, radio resources amongst radio blocks by each one of a plurality of base stations in response to quality-of-service parameters required by the application, the method comprising:

estimating occupation rates of the radio blocks during consecutive radio frames, wherein the radio blocks are shared in a predetermined frequency band during a periodic radio frame between the plurality of base stations, each of the radio blocks spreading on frequencies of the predetermined frequency band during a time slot of the periodic radio frame, and each of the radio blocks are able to be associated with a communication link between any one of the plurality of base stations and a mobile station, and allocating to the application at least one radio block having an occupation rate less than a threshold and a periodicity expressed in period of frame and depending on the required quality-of-service parameters.

2. A method according to claim 1, further including in each station of the plurality of base stations over-amplifying predefined radio elements in a radio block allocated to an application included in said each station, each radio block being made of radio elements spread on frequencies of the radio block and equi-distributed in the time slot of the radio block, and wherein estimating the occupation rate of a radio block includes measuring a received mean power associated with the over-amplified predefined radio elements of the radio block and a received mean power associated with the other radio elements of the radio block, determining the difference of the measured received mean powers for the radio block in each one of the consecutive radio frames, and determining the average of the mean power differences during the consecutive radio frames constituting the occupation rates.

3. A method according to claim 2, wherein over-amplifying predefined radio elements in allocated and not allocated blocks of all the frames having the same location as that of an allocated radio block depends on the allocation periodicity of the allocated radio block.

4. A method according to claim 2, wherein over-amplifying predefined radio elements in any radio block allocated to any of the plurality of base stations is constant.

5. A method according to claim 2, including suppressing over-amplifying the predefined radio elements in a radio block for a data emission from any one of the plurality of base stations in at least one radio frame preceding the expiration of an allocation duration.

6. A method according to claim 1, wherein allocating a radio block to the requesting application includes selecting iteratively one or several scarcely occupied radio blocks until of radio resource quantities associated with the selected radio blocks and cumulated for a required allocation duration according to the required quality-of-service parameters are at least equal to a required radio resource quantity derived from the required quality-of-service parameters, and for each allocated selected radio block, selecting a first radio frame wherein the allocated selected radio block is a priori unoccupied.

7. A method according to claim 6, wherein selecting iteratively of one or several scarcely occupied radio blocks iteratively includes selecting a scarcely occupied radio block in the frames, determining an allocation periodicity to be associated with the selected radio block depending on the occupation rate of the selected radio block and on the required quality-of-service parameters, and determining a quantity of radio resources associated with the selected radio block for the required allocation duration, as long as the sum of the radio resource quantities associated with the selected radio blocks for the required allocation duration is not at least equal to the required radio resource quantity.

8. A method according to claim 6, wherein selecting a first radio frame for each allocated selected radio block includes selecting any first frame if the allocated selected radio block is unoccupied, and if the allocated selected radio block is partially occupied in consecutive frames, determining a difference of a mean power associated with predefined radio elements of the allocated selected radio block and a mean power associated with the other radio elements of the allocated selected radio block for each one of previous consecutive frames in number equal to the periodicity of the allocated selected radio block, and selecting amongst the previous consecutive frames a first frame for which the difference of mean powers is nil.

9. A method according to claim 1, wherein a radio block is allocatable to the application if the average of mean powers associated with radio elements in the radio block and measured during consecutive radio frames is less than a threshold, whatever the occupation rate of the radio block.

10. A method according to claim 1, including modifying one of the required quality-of-service parameters as a result of an at least partial alteration of the transmission of data of the application within the allocated radio block.

11. A radio communication system, comprising:
a plurality of base stations, each configured for allocating, to an application, radio resources amongst radio blocks in response to quality-of-service parameters required by the application, each station of the plurality of base stations comprising:
means for estimating occupation rates of the radio blocks during consecutive radio frames, wherein the radio blocks are shared in a predetermined frequency band during a periodic radio frame between the plurality of base stations, each of the radio blocks spreading on frequencies of the predetermined frequency band during a time slot of the periodic radio frame, and each of the radio blocks are able to be associated with a communication link between any one of the plurality of base stations and a mobile station, and
means for allocating to the application at least one radio block having an occupation rate less than a threshold and a periodicity expressed in period of frame and depending on the required quality-of-service parameters.

12. A radio communication system according to claim 11, wherein said each station includes means for over-amplifying predefined radio elements in a radio block allocated to an application included in said each station, each radio block being made of radio elements spread on frequencies of the radio block and equi-distributed in the time slot of the radio block, means for measuring a received mean power associated with the over-amplified predefined radio elements of a radio block and a received mean power associated with the other radio elements of the radio block, and means for determining the difference of the measured received mean powers for the radio block in each one of the consecutive radio frames, the estimating means being adapted to determine the average of the mean power differences during the consecutive radio frames constituting the occupation rates.

13. A base station for allocating to an application radio resources amongst radio blocks in response to quality-of-service parameters required by the application, comprising:
means for estimating occupation rates of the radio blocks during consecutive radio frames, wherein the radio blocks are shared in a predetermined frequency band during a periodic radio frame between the base station and one or more other base stations, each of the radio blocks spreading on frequencies of the predetermined frequency band during a time slot of the periodic radio frame, and each of the radio blocks are able to be associated with a communication link between the base stations and a mobile station, and
means for allocating to the application at least one radio block having an occupation rate less than a threshold and a periodicity expressed in period of frame and depending on the required quality-of-service parameters.

14. A non-transitory computer-readable medium comprising instructions executable by a base station to allocate, to an application, radio resources amongst radio blocks in response to quality-of-service parameters required by the application, the instructions comprising:

estimating occupation rates of the radio blocks during consecutive radio frames, wherein the radio blocks are shared in a predetermined frequency band during a periodic radio frame between the plurality of base stations, each of the radio blocks spreading on frequencies of the predetermined frequency band during a time slot of the periodic radio frame, and each of the radio blocks are able to be associated with a communication link between any one of the plurality of base stations and a mobile station; and allocating to the application at least one radio block having an occupation rate less than a threshold and a periodicity expressed in period of frame and depending on the required quality-of-service parameter.

* * * * *